(12) United States Patent
Tyler

(10) Patent No.: US 6,601,821 B2
(45) Date of Patent: Aug. 5, 2003

(54) PROPORTIONAL CONTROL VALVE ASSEMBLY FOR EXHAUST GAS RECIRCULATION SYSTEM

(75) Inventor: Jeffrey A. Tyler, Newark, NY (US)

(73) Assignee: G. W. Lisk Company, Inc., Clifton Springs, NY (US)

( * ) Notice: Subject to any disclaimer, the term of this patent is extended or adjusted under 35 U.S.C. 154(b) by 0 days.

(21) Appl. No.: 10/002,586

(22) Filed: Nov. 15, 2001

(65) Prior Publication Data

US 2002/0066441 A1 Jun. 6, 2002

Related U.S. Application Data

(60) Provisional application No. 60/249,937, filed on Nov. 17, 2000.

(51) Int. Cl.[7] ............................................. F16K 31/12
(52) U.S. Cl. ........................................ 251/30.02; 91/387
(58) Field of Search ........................... 251/30.01, 30.02; 137/625.67; 91/387

(56) References Cited

U.S. PATENT DOCUMENTS

| | | | | |
|---|---|---|---|---|
| 3,757,823 A | * | 9/1973 | Knutson | 137/625.64 |
| 3,783,901 A | * | 1/1974 | Schneider et al. | 137/625.64 |
| 4,201,116 A | * | 5/1980 | Martin | 137/625.64 |
| 4,485,846 A | * | 12/1984 | Neff | 251/30.01 |
| 4,596,271 A | * | 6/1986 | Brundage | 251/30.01 |
| 5,366,202 A | * | 11/1994 | Lunzman | 251/30.05 |
| 5,520,217 A | * | 5/1996 | Grawunde | 251/30.01 |
| 5,605,289 A | | 2/1997 | Maley et al. | 239/585.1 |
| 5,632,258 A | | 5/1997 | Tsuzuki et al. | 123/571 |
| 5,865,156 A | | 2/1999 | Feucht et al. | 123/446 |
| 6,024,060 A | | 2/2000 | Buehrle, II et al. | 123/90.12 |
| 6,026,791 A | | 2/2000 | Arnold | 123/568.27 |
| 6,050,248 A | | 4/2000 | Arulraja et al. | 123/568.11 |
| 6,173,684 B1 | | 1/2001 | Buehrle, II et al. | 123/90.12 |
| 6,178,956 B1 | | 1/2001 | Steinmann et al. | 123/568.21 |
| 6,182,646 B1 | | 2/2001 | Silberstein et al. | 123/568.26 |

* cited by examiner

*Primary Examiner*—Ehud Gartenberg
*Assistant Examiner*—John Bastianelli
(74) *Attorney, Agent, or Firm*—Eugene Stephens & Associates; Thomas B. Ryan

(57) ABSTRACT

A two-stage proportional control valve assembly regulates flow of a first fluid such as an engine exhaust gas using a second fluid such as engine oil for power. A directional valve under control of an electrical actuator regulates flows of the second fluid to operate a fluid-powered actuator. A mechanical connection between the fluid powered actuator and a flow control valve for regulating flows of the first fluid enables the electrical actuator to indirectly control the flow control valve with a minimum draw.

22 Claims, 3 Drawing Sheets

PROPORTIONAL CONTROL VALVE ASSEMBLY FOR EXHAUST GAS RECIRCULATION SYSTEM

This application claims the benefit of U.S. Provisional Application No. 60/249,937, filed on Nov. 17, 2000, which provisional application is incorporated by reference herein.

TECHNICAL FIELD

A valve assembly regulates flow of a fluid or movement of a device by controlling the flow of a separate working fluid responsive to an electrical control signal.

BACKGROUND

Emission control systems for internal combustion engines recirculate a portion of the exhaust gases emitted from the engines back through the combustion process to lower harmful emissions. Exhaust gas recirculating valves (EGRV) connected to exhaust manifolds divert metered amounts of the exhaust gas to intake manifolds for re-burn by the engine. The exhaust gases are mixed with fresh air/fuel mixtures resulting in a lowering of combustion temperature and a reduction in the formation of harmful compounds such as nitrous oxide.

SUMMARY OF INVENTION

The invention features a two-stage proportional flow control valve assembly that is particularly useful for regulating exhaust flow rates in exhaust gas re-circulating systems of internal combustion engines. Electrical control signals from an engine control module (ECM) regulate the exhaust flow rates through an exhaust valve utilizing engine oil pressure to produce a hydraulic actuating force. Since the electrical control signals are not required to provide the force for opening or closing the exhaust valve, my new two-stage proportional flow control valve assembly conserves electrical power for other functions.

An exemplary two-stage proportional flow control valve assembly adapted for use as an exhaust gas recirculating valve incorporates an exhaust valve that regulates exhaust flow rates recirculated to an engine and a directional valve that utilizes engine oil pressure for regulating opening and closing of the exhaust valve proportional to control signals from an engine control module (ECM). Moveable components of the exhaust valve are preferably pressure balanced with respect to the flow of exhaust gas through the exhaust valve to optimize positional accuracy. A fluid-powered actuator movable under the influence of engine oil pressure provides the necessary force for opening and closing the exhaust valve. The directional valve controls flow of the pressurized engine oil to the fluid-powered actuator to adjust the position of the exhaust valve proportional to the control signal.

The movable portion of the exhaust valve is preferably a pressure-balanced dual poppet head body with each of two poppet heads having an approximately equal opposing area exposed to exhaust gas pressures. The dual poppet heads translate along a central axis for opening and closing exhaust passages encircled by mating poppet seats. The fluid-powered actuator is preferably a double-acting cylinder having a piston mechanically coupled to the dual poppet head body for effecting common movement along the central axis. The directional valve is preferably a four-way servovalve in the form of a spool valve that regulates flows of pressurized engine oil to opposite faces of the piston. The spool valve includes a spool also movable along the central axis between (a) an initial position that charges a proximal face of the piston with the pressurized engine oil for moving the piston in a direction that closes the exhaust valve and (b) an actuated position that charges a distal face of the piston with the pressurized engine oil for moving the piston in a direction that opens the exhaust valve.

An electrical actuator preferably in the form of a proportional solenoid under control of the electronic control module (ECM) converts the control signals of varying current into proportional forces imparted by an armature against the spool along the central axis. A feedback mechanism, preferably in the form of a compression spring, also located along the central axis, applies a separating force between the spool and the piston proportional to its displacement. An adjustable null compression spring or other biasing mechanism biases the solenoid armature against the spool. Thus, the spool and the armature are preferably biased together from opposite directions by two springs—the null spring acting on the spool in the same direction as the solenoid armature and the feedback spring acting on the spool in the opposite direction.

In the absence of an actuating force from the solenoid, the feedback spring, which is the stronger of the two springs, biases the spool against an armature stop, which corresponds to the initial spool position at which the proximal face of the piston is pressurized for closing the exhaust valve. Compression of the null spring can be adjusted to establish a proper take-off current to the solenoid at which the sum of the forces imparted by the null spring and the solenoid are sufficient to move the spool against the feedback spring. Additional current moves the spool further against the feedback spring to the actuated position at which the distal face of the piston is pressurized for opening the exhaust valve.

Upon reaching the actuated position, further movement of the spool is limited by contact between the solenoid armature and the armature stop. The initial and actuated positions can be adjusted to set maximum flow rates through the spool valve in either direction. Movement of the spool to the actuated position compresses the feedback spring up to the limit set by the armature stop. Movement of the piston in response to the charging of its distal face further compresses the compression spring until a counteracting force exerted by the piston through the compression spring momentarily exceeds the sum of the forces exerted on the spool by the null spring and solenoid and returns the spool to a so-called neutral position (i.e., a position between the actuated and the initial positions) at which further flow to the piston is stopped.

Actuating forces exerted by the solenoid above the take-off current temporarily move the spool beyond the neutral position until the counteracting force of the piston returns the spool to the neutral position. Although the spool returns to the same neutral position throughout the intended range of solenoid actuating forces above the take-off current, the piston's position (and with it the position of the dual poppet head body of the exhaust-valve) varies directly with the compression of the feedback spring. Any change in the actuating force produces a corresponding change in the compression of the feedback spring, which exerts a force equal and opposite to the sum of the forces exerted on the spool by the null spring and the solenoid. The force exerted by the null spring remains the same at the neutral position, so the change in the force exerted by the feedback spring matches the change in the force exerted by the solenoid.

The feedback spring is the sole mechanical connection between the piston and the spool. The amount that the feedback spring is compressed is controlled by the amount of current that is applied to the solenoid. Movement of the spool to the actuated position starts the compression of the feedback spring, and the engine-oil powered displacement of the piston completes the required compression of the feedback spring while restoring the spool to the neutral position. The amount of compression of the feedback spring determines the spacing of the piston from the spool in the neutral position. Changes in the position of the piston are accompanied by corresponding changes in the position of the dual poppet head body of the exhaust valve.

The control signal (i.e., current) to the solenoid provides a proportional control that modulates both opening and closing of the exhaust valve, while the force for actually operating the exhaust valve is derived from engine oil pressure. Neither changes in the engine oil pressure nor changes in the external pressure applied to the dual poppet head body unduly affect the exhaust valve position. The spool valve maintains the position of the piston independently of overall oil pressure, which can affect flow rates but not ultimate positions of the valve components. The neutral position blocks flows to or from either side of the piston to maintain the exhaust valve in a desired position. Balancing the dual poppet head body to exhaust gas pressures also limits the influence of the exhaust gas pressures or flow rates on the valve position. This independence of the new two-stage proportional control valve from changes in the exhaust and engine oil pressures, together with the linear and proportional modulation of flow rates through the exhaust valve with respect to the electrical control signal, makes this new valve particularly accurate, reliable, and robust.

The new valve is expected to contribute to reducing harmful engine emissions while operating more efficiently by utilizing engine oil pressure to move the exhaust valve. The valve is also expected to have a variety of other uses in situations where proportional movement of a valve or other device is modulated by low-power control signals regulating the flow of working fluid in an intermediate actuator.

DRAWINGS

DETAILED DESCRIPTION

Figure 1:
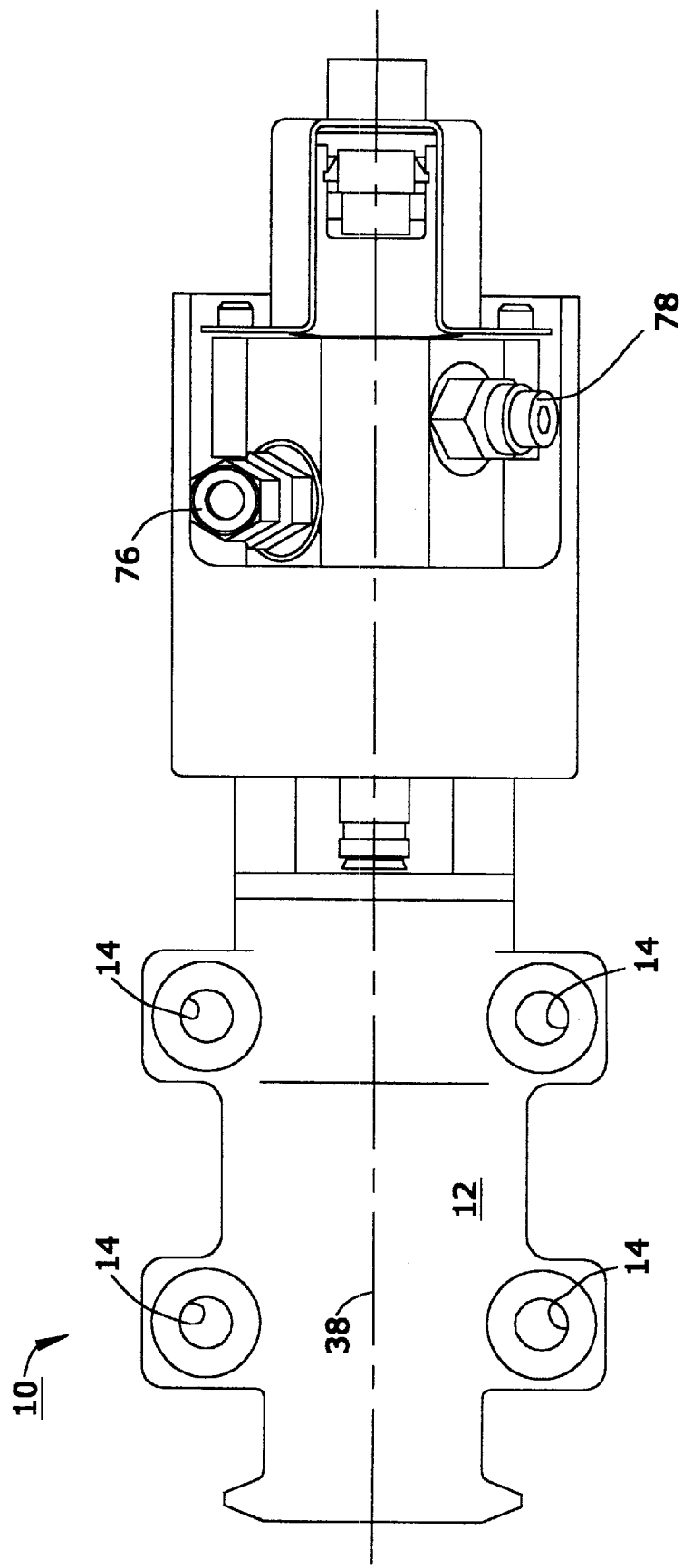
FIG. 1 is a plan view of an exemplary exhaust gas re-circulation (EGR) valve in accordance with my invention.
Figure 2:
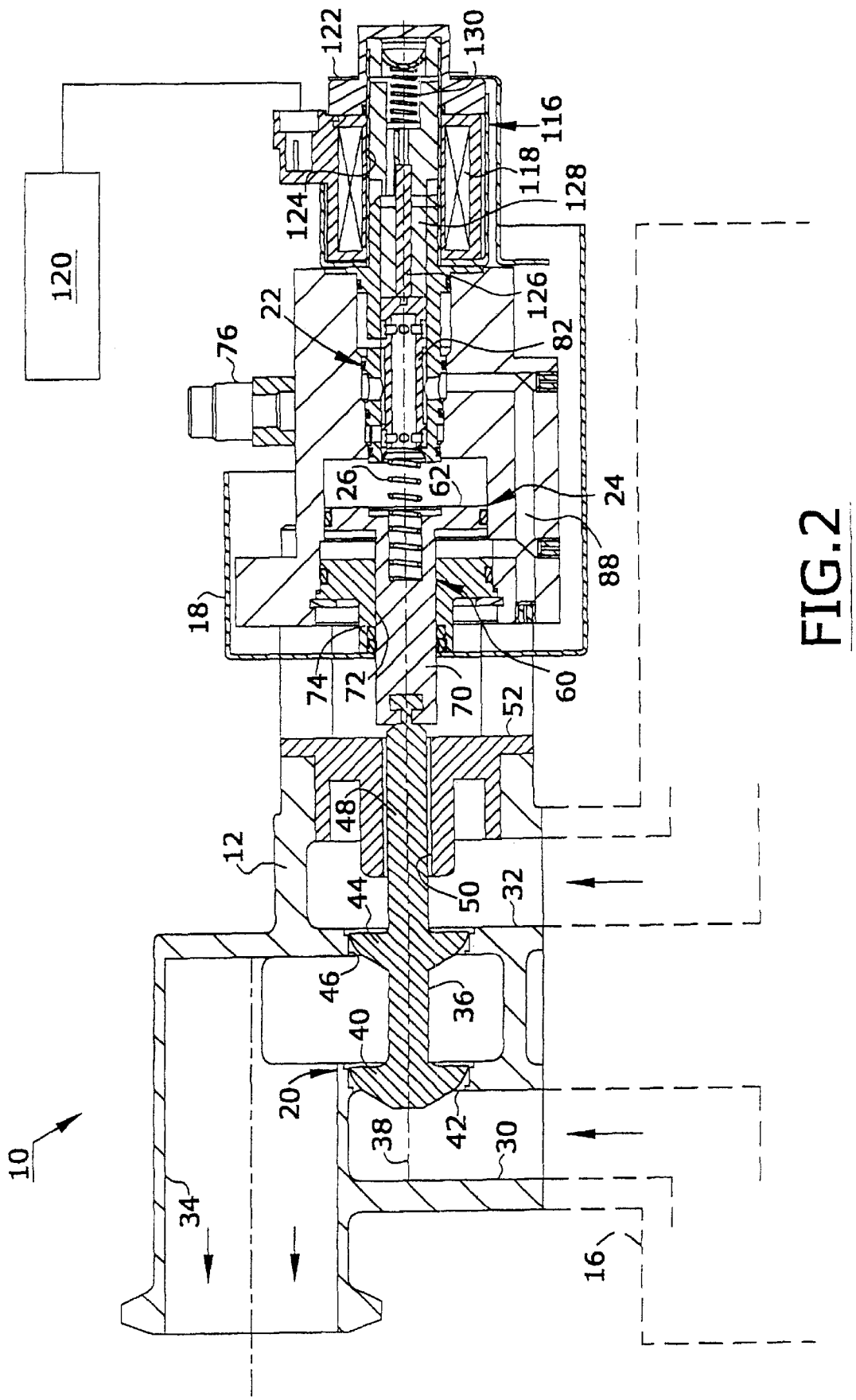
FIG. 2 is a side cross-sectional view through the valve.

The exhaust gas re-circulating valve of the three drawing figures is a two-stage proportional control valve assembly 10 having a housing 12 that can be bolted or otherwise attached (e.g., through bolt holes 14) to an internal combustion engine exhaust manifold 16 shown by phantom line in FIG. 2. Within the housing 12 are assembled an exhaust valve 20 and a four-way servovalve 22 interconnected in succession by a double-acting cylinder 24 and a feedback compression spring 26. A heat shield 18 protects the servovalve 22 and the double-acting cylinder 24 from exposure to heat from the exhaust manifold 16.

The exhaust valve 20 regulates flows between two exhaust gas inlet passages 30 and 32 and a combined exhaust gas outlet passage 34 formed within the housing 12. The two exhaust gas inlet passages 30 and 32 admit exhaust gases from the engine exhaust manifold 16. The exhaust gas outlet passage 34 directs a metered flow of the exhaust gases toward an engine inlet manifold (not shown).

Flows between the exhaust gas inlet passages 30 and 32 and the combined exhaust gas outlet passage 34 are interrupted by a dual poppet head body 36 that is movable along a central axis 38. The dual-poppet head body 36, includes (a) a first poppet head 40 that mates with a seat 42 encircling an end of the inlet passage 30 for restricting flows between the inlet passage 30 and the combined outlet passage 34 and (b) a second poppet head 44 that mates with a seat 46 encircling an end of the inlet passage 32 for restricting flows between the inlet passage 32 and the combined outlet passage 34. The two poppet head seats 42 and 46 have equally sized pressure areas, and the inlet passages 30 and 32 apply exhaust gas pressure to the two poppet heads 40 and 44 from opposite directions to balance the dual poppet head body 36 with respect to the exhaust gas pressure. The dual poppet head body 36 also includes a shank 48 mounted within a guide bore 50 of a housing flange 52. The shank 48 communicates motion along the central axis 38 for opening and closing the exhaust valve 20.

Figure 3:
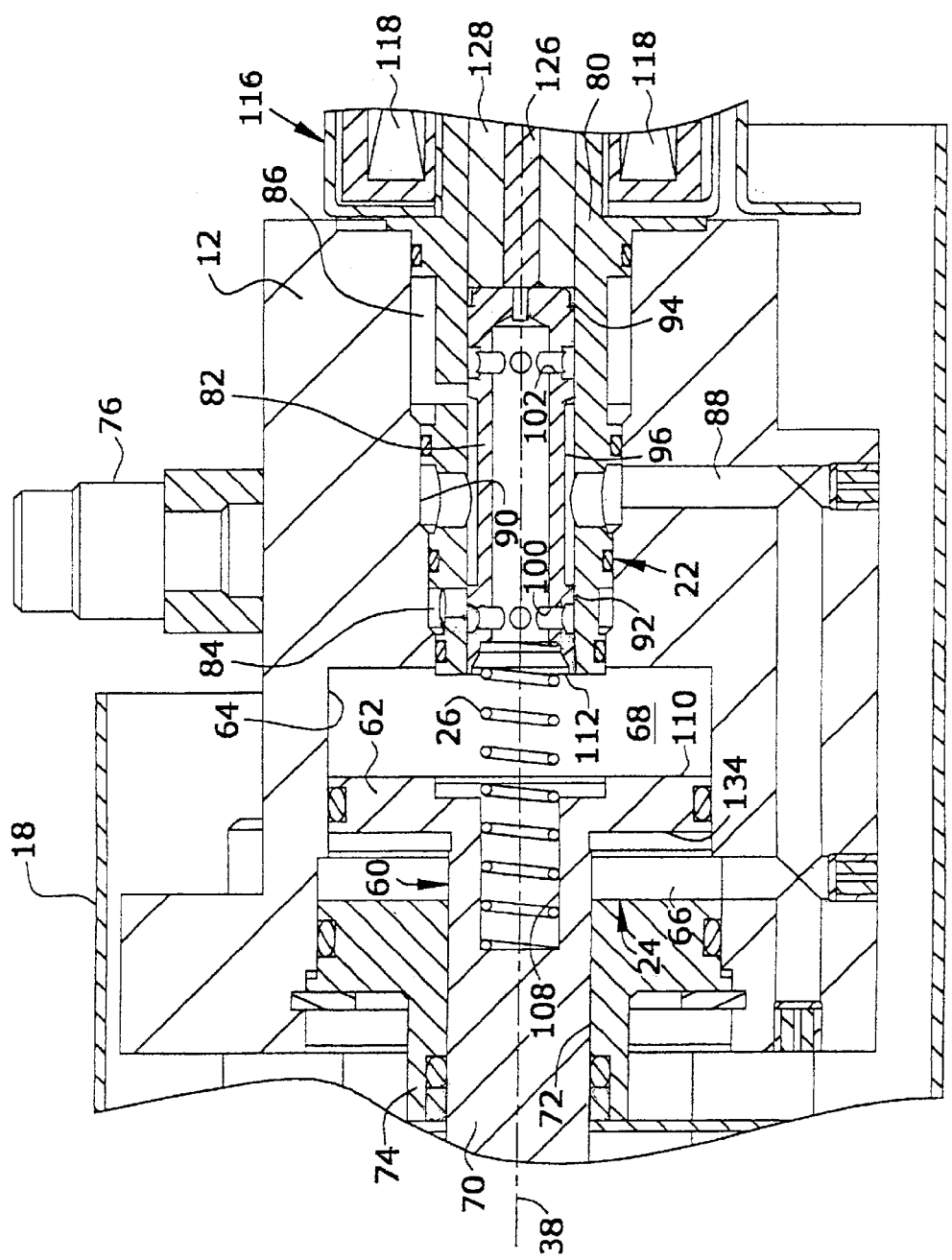
FIG. 3 is an enlarged cut away of the view in FIG. 2 showing a spool valve portion in clearer detail.

The double-acting cylinder 24, which functions as a hydraulic actuator, includes a piston 60 having a head 62 that divides a housing bore 64 into two separately pressurizable chambers 66 and 68 (shown in FIG. 3). A shank 70 connected to the piston head 62 is coupled directly to the shank 48 of the dual poppet head body 36. A guide bore 72 formed within a housing flange 74 supports movement of the entire piston 60 along the central axis 38.

The four-way servovalve 22 is a spool valve having a supply port 76 connected to source of engine oil pressure (not shown) and a tank port 78 connected to an engine oil sump (also not shown). Within the housing 12, a spool guide tube 80 supports a spool 82 for movement along the central axis 38. The supply port 76 feeds pressurized oil through the housing 12 to a supply passage 84 in the guide tube 80. Oil collected in a return passage 86 in the guide tube 80 returns through the housing 12 to the tank port 78. A working passage 88 also formed in the guide tube 80 and the housing 12 directs flows of the engine oil to or from the cylinder chamber 66. An axial bore 90 within the spool 82 communicates openly with the cylinder chamber 68.

On its peripheral surface, the spool 82 has a pair of annular lands 92 and 94 that open and close alternative flow paths between the supply passage 84 and the return passage 86. Both the supply passage 84 and the return passage 86 are alternately connectable to the working passage 88 and the axial bore 90 for charging and discharging the cylinder chambers 66 and 68 on opposite sides of the piston head 62. An annular recess 96 formed in the circumference of the spool 82 between the spool lands 92 and 94 alternately connects the working passage 88 to either the supply passage 84 or the return passage 86. Radial bores 100 and 102 formed through the spool 82 straddling the two annular lands 92 and 94 alternately connect the axial bore 90 to either the supply passage 84 or the return passage 86. The spool 82 is balanced with respect to the engine oil pressure.

The feedback compression spring 26 extends between the piston head 62 and the spool 82. One end of the compression spring 26 is mounted within a recess 108 in a proximal face 110 of the piston head 62, and the other end of the spring 26 is mounted in an open end face 112 of the spool 82. The feedback spring 26 exerts a reactionary force inversely proportional to the amount of separation between the piston head 62 and the spool 82.

A solenoid 116, which functions as an electrical force motor actuator, pushes the spool 82 against the feedback compression spring 26 through a limited range of travel. A coil 118 powered by a range of electrical currents regulated by an electronic control module (ECM) 120 generates a magnetic force on an armature 122, which is moveable along the central axis 38 within a solenoid guide bore 124. An actuator rod 126 passing through an armature stop 128 connects the armature 122 to the spool 82. A null compression spring 130 biases the armature 122 and the actuator rod 126 against one end of the spool 82 with an initial force that is slightly less than the initial force exerted on the other end of spool 82 by the feedback spring 26.

When no current is applied to the solenoid 116, the stronger feedback spring 26 biases the spool 82 to an initial position shown in FIGS. 2 and 3. The spool 82 is forced back against the armature stop 128 to the initial position that partially opens a passageway through the radial bore 100 between the supply passage 84 and the axial bore 90 for charging the cylinder chamber 68. At the same initial position, a passageway through the annular recess 96 provides an opening between the working passage 88 and the return passage 86 for discharging the cylinder chamber 66. The pressure in cylinder chamber 68 produces a hydraulic force against the proximal face 110 of the piston head 62 and pushes the piston 60 in a direction that maintains the exhaust valve 20 in a closed position.

Applying current to the solenoid 116 above a given take-off current moves the spool 82 away from the armature stop 128 and further compresses the feedback spring 26. The further movement of the spool is limited by contact between the solenoid armature 122 and the armature stop 128 at an actuated position that discharges the cylinder chamber 68 and charges the cylinder chamber 66. At the actuated position, the annular recess 96 connects the supply passage 84 to the working passage 88 for charging the cylinder chamber 66, and the radial bore 102 connects the axial bore 90 to the return passage 86 for discharging the cylinder chamber 68.

The accumulating pressure in the cylinder chamber 66 produces a hydraulic force against a distal face 134 of the piston head 62 that moves the piston head 62 together with the dual poppet head body 36 in a direction that compresses the feedback spring 26 and opens the exhaust valve 20. The movement of the piston head 62 further compresses the feedback spring by an amount required to momentarily overcome the combined forces of the solenoid 116 and the null spring 130 and return the spool 82 to a neutral position at which further flows to and from the double-acting cylinder 24 are blocked.

At the neutral position of the spool 82, which is located between the initial and actuated positions, the spool 82 locks fluid in the cylinder chambers 66 and 68, thus locking the position of the double-acting cylinder 24 and the exhaust valve 20. The feedback spring 26 is compressed by an amount that exerts a force against one end of the spool 82 equal and opposite to the combined forces exerted by the solenoid 116 and the null spring 130 against the opposite end of the spool 82. Any movement of the piston head 68 that would change the compression the feedback spring 26 reverses flow through the double-acting cylinder 24 and restores the piston head 26 to the position required to maintain the spool 82 in the neutral position.

The minimum actuating force of the solenoid 116 (i.e., the takeoff current) required for opening the exhaust valve 20 compresses the feedback spring 26 by an amount that moves the spool 82 just beyond the neutral position. The counteracting hydraulic force generated by the double-acting cylinder 24 moves the piston head 62 and with it the dual poppet head body 36 by an amount required to return the spool 82 to the neutral position. The exhaust valve 20 opens by the amount the feedback spring 26 is compressed by the movement of the spool 82 beyond the neutral position.

Applying more current to the solenoid 116 momentarily moves the spool 82 to the full activated position at which further movement of the spool is stopped by contact between the solenoid armature 122 and the armature stop 128. Differential pressure across the piston head 62 builds until a hydraulic force against the distal face 134 of the piston acting through the feedback spring 26 forces the spool 82 to return to the neutral position. Initially, the feedback spring 26 is compressed by movement of the spool 82 toward the piston head 62 until the spool 82 reaches the actuated position. In response, the piston head 62 moves toward the travel-limited spool 82, additionally compressing the feedback spring by an amount required to overcome the remaining combined forces of the solenoid 116 and the null spring 130 and thereby return the spool 82 to the neutral position.

The change in position of the piston head 62 along with the dual poppet head body 36 can be far beyond the limited range of spool travel and is substantially proportional to the change in the solenoid actuating force. The travel range of the spool 82 is limited to control maximum flow rates to and from the double-acting cylinder 24 as a compromise between response time and valve stability. The travel range of the piston head 62 of the double-acting cylinder 24 corresponds to the desired range of travel of the dual poppet head body 36 of the exhaust valve 20. The spring rate of the feedback spring 26 is set so that the change in compression of the feedback spring 26 in response to the range of actuating forces imparted by the solenoid 116 matches the desired range of travel of the dual poppet head body 36.

Applying less current to the solenoid 116 momentarily moves the spool 82 toward the initial position, where the spool remains until movement of the piston head 62 in the opposite direction decompresses the compression spring 26 equal to the reduced solenoid actuating force. Differential pressure across the piston head 62 is reduced or, if necessary, momentarily reversed to restore the spool 82 to the neutral position. A new equilibrium is restored at the neutral position of the spool 82 with the feedback spring 26 less compressed and with the dual poppet head body 36 in a less open position of the exhaust valve 20.

The maximum actuating force of the solenoid 116 is only required to withstand the maximum compression of the feedback spring 26, whose spring rate can be specifically tailored to the force range of the solenoid 116. The hydraulic force produced by the double-acting cylinder 24 provides whatever force is actually necessary to move the dual poppet head body 36 and to counteract the forces imparted by the solenoid 116. Thus, engine oil pressure provides the primary force for opening and closing the exhaust valve 20, while electrical current is required mainly for purposes of control (i.e., choosing the desired position of the exhaust valve). In fact, the actuating force imparted by the solenoid 116 for opening the exhaust valve 20 points in a direction opposite to the direction the double-acting cylinder 24 moves the dual poppet head body 36 for opening the exhaust valve 20.

Although specific examples have been given of flow control valves or devices, directional valves, biasing mechanisms, and fluid-powered and electrical actuators for use in my new two-stage proportional flow control valve assembly, other such valves, devices, mechanisms, and actuators can be substituted in accordance with the overall teaching of this invention for regulating not only flows of exhaust but other fluid flows or mechanical movements that are independent of the source of fluid pressure for operating the valve assembly. For example, the exhaust valve can be a flow control valve having the same or different seating action for regulating flow rates. The source of fluid pressure for operating my new valve is preferably different from both the fluid flows regulated by the valve and the control signals imparted to the valve. Instead of opening and closing a flow control valve, the proportional control can be arranged to adjust the operating positions of other hydraulic or mechanical devices as a function of a low-power control signal.

I claim:

1. A two-stage proportional control valve assembly comprising:
    a flow-regulating valve that regulates a flow of a first fluid;
    a double-acting actuator powered by a second fluid for moving the flow-regulating valve in different open and closed directions for correspondingly opening and closing the flow-regulating valve;
    a directional valve that controls a flow of the second fluid to the double-acting actuator;
    an electrical actuator that converts a control signal into a force acting on the directional valve for adjusting a position of the double-acting actuator in accordance with the control signal;
    the double-acting actuator having
        (a) a first surface arranged for exposure to fluid pressure of the second fluid for moving the flow-regulating valve in the open direction and
        (b) a second surface arranged for exposure to fluid pressure of the second fluid for moving the flow-regulating valve in the closed direction; and
    the directional valve being movable under influence of the electrical actuator between
        (a) a first position that directs a flow of the second fluid to the first surface of the double-acting actuator and
        (b) a second position that directs a flow of the second fluid to the second surface of the double-acting actuator.

2. The valve of claim 1 in which the directional valve is a four-way directional valve that regulates flows of fluid to and from the first and second faces of the double-acting actuator.

3. The valve of claim 2 in which the double-acting actuator is a double-acting piston, and the first and second surfaces of the double-acting actuator are opposing surfaces of a piston.

4. The valve of claim 2 in which the directional valve is a spool movable between
    (a) the first directional valve position, which
        (i) provides communication between the first surface of the double-acting actuator and a supply port that is connectable to a high-pressure side of a fluid power source and
        (ii) provides communication between the second surface of the double-acting actuator and a tank port that is connectable to a low-pressure side of the fluid power source, and
    (b) the second directional valve position, which
        (i) provides communication between the second surface of the double-acting actuator and the supply port that is connectable to the high-pressure side of the fluid power source and
        (ii) provides communication between the first surface of the double-acting actuator and the tank port that is connectable to the low-pressure side of the fluid power source.

5. The valve of claim 4 in which the spool is also moveable to a neutral position at which communication between both the first and second surfaces and the supply and tank ports is blocked.

6. The valve of claim 5 in which a feedback spring connects the spool to the double-acting actuator, and movement of the spool to the first directional valve position also moves the double-acting actuator in a direction that compresses the feedback spring and moves the flow-regulating valve in the open direction.

7. The valve of claim 6 in which movement of the spool to the second directional valve position also moves the double-acting actuator in a direction that decompresses the feedback spring and moves the flow-regulating valve in the closed direction.

8. The valve of claim 5 in which a feedback spring connects the spool to the double-acting actuator, and movement of the spool to one of the first and second directional valve positions also moves the double-acting actuator in a direction that restores the spool to the neutral position.

9. The valve of claim 8 in which movement of the double-acting actuator adjusts compression of the feedback spring in relation to the force imparted by the electrical actuator on the directional valve.

10. The valve of claim 9 in which the double-acting actuator is mechanically connected to the flow-regulating valve and a range of open positions occupied by the flow-regulating valve correspond to different compressions of the feedback spring.

11. The valve of claim 1 in which the flow-regulating valve includes a poppet head pressure balanced with respect to the first fluid and freely movable with the double-acting actuator.

12. A method of controlling flow rates of a first fluid utilizing fluid pressure supplied by a second fluid comprising the steps of:
    converting an electrical signal into a force imparted to a directional valve that controls a flow of the second fluid to a double-acting actuator;
    moving the directional valve in response to the force converted from the electrical signal between a first position that directs a flow of the second fluid to a first surface of the double-acting actuator and a second position that directs a flow of the second fluid to a second surface of the double-acting actuator;
    providing feedback between the double-acting actuator and the directional valve that overcomes the force imparted to the directional valve and restores the directional valve to a neutral position at which differential flows of the second fluid to the first and second surfaces are blocked;
    moving the double-acting actuator through a range of positions corresponding to different amounts of the feedback between the double-acting actuator and the directional valve at the neutral position of the directional valve; and
    linking movement of the double-acting actuator to movement of a flow-regulating valve that controls flow rates of the first fluid for changing flow rates of the first fluid through the flow-regulating valve in response to changes in the electrical signal.

13. The method of claim 12 in which the step of moving the double-acting actuator includes moving the double-acting actuator in opposite directions in response to pressure of the second fluid being alternately applied to the first and second surfaces of the double-acting actuator.

14. The method of claim 12 in which the step of providing feedback includes compressing a spring between the directional valve and the double-acting actuator.

15. The method of claim 14 in which the step of providing feedback includes relating changes in compressive force of the spring to changes in the force converted from the electrical signal.

16. The method of claim 12 in which the step of moving the directional valve to the first position includes directing a corresponding flow of fluid from the second surface.

17. The method of claim 16 in which the step of moving the directional valve to the second position includes directing a corresponding flow of fluid from the first surface.

18. The method of claim 12 in which the step of linking includes allowing a flow control component of the flow-regulating valve to move freely with the double-acting actuator.

19. The method of claim 18 in which the step of linking includes pressure balancing the flow control component of the flow-regulating valve with respect to the first fluid.

20. A proportional control valve for regulating movement of a device comprising:

a double-acting actuator movable under the influence of fluid power;

the double-acting actuator being connected to the device for imparting corresponding movements to the device;

the double-acting actuator having
   (a) a first surface arranged for exposure to fluid pressure for imparting movement to the double-acting actuator in a first direction and
   (b) a second surface arranged for exposure to fluid pressure for imparting movement to the double-acting actuator in a second direction;

a directional valve that regulates flows of fluid to and from the first and second surfaces of the double-acting actuator;

an electrical actuator that converts a control signal into a force acting on the directional valve;

the directional valve being movable under influence of the electrical actuator between
   (a) a first position that directs flows of fluid to the first surface of the double-acting actuator and away from the second surface of the double-acting actuator for moving the double-acting actuator in the first direction,
   (b) a second position that directs flows of fluid to the second surface of the double-acting actuator and from the first surface of the double-acting actuator for moving the double-acting actuator in the second direction, and
   (c) a neutral position that blocks differential flows of fluid to and from the first and second surfaces of the double-acting actuator for preventing further movement of the double-acting actuator in the first and second directions;

a feedback mechanism connecting the double-acting actuator to the directional valve for imparting a feedback force in response to movement of the double-acting actuator that restores the directional valve to a neutral position;

a spacing between the double-acting actuator and the directional valve being related to the feedback force; and the feedback force being related to the force converted from the electrical signal for regulating movement of the device in accordance with the control signal.

21. The valve of claim 20 further comprising a biasing mechanism that imparts a biasing force on the directional valve in a direction in common with the force converted from the electrical signal for restoring the directional valve to the neutral position in response to movement of the double-acting actuator in a direction that increases the spacing between the double-acting actuator and the directional valve.

22. The valve of claim 20 in which the directional valve includes a spool movable between
   (a) the first directional valve position, which
      (i) provides communication between the first surface of the double-acting actuator and a supply port that is connectable to a high-pressure side of a fluid power source and
      (ii) provides communication between the second surface of the double-acting actuator and a tank port that is connectable to a low-pressure side of the fluid power source,
   (b) the second directional valve position, which
      (i) provides communication between the second surface of the double-acting actuator and the supply port that is connectable to the high-pressure side of the fluid power source and
      (ii) provides communication between the first surface of the double-acting actuator and the tank port that is connectable to the low-pressure side of the fluid power source, and
   (c) the neutral position, which blocks communication between both the first and second surfaces and the supply and tank ports.

* * * * *